GARDEN TOOL COMBINATIONS
Filed Dec. 2, 1955 4 Sheets-Sheet 1
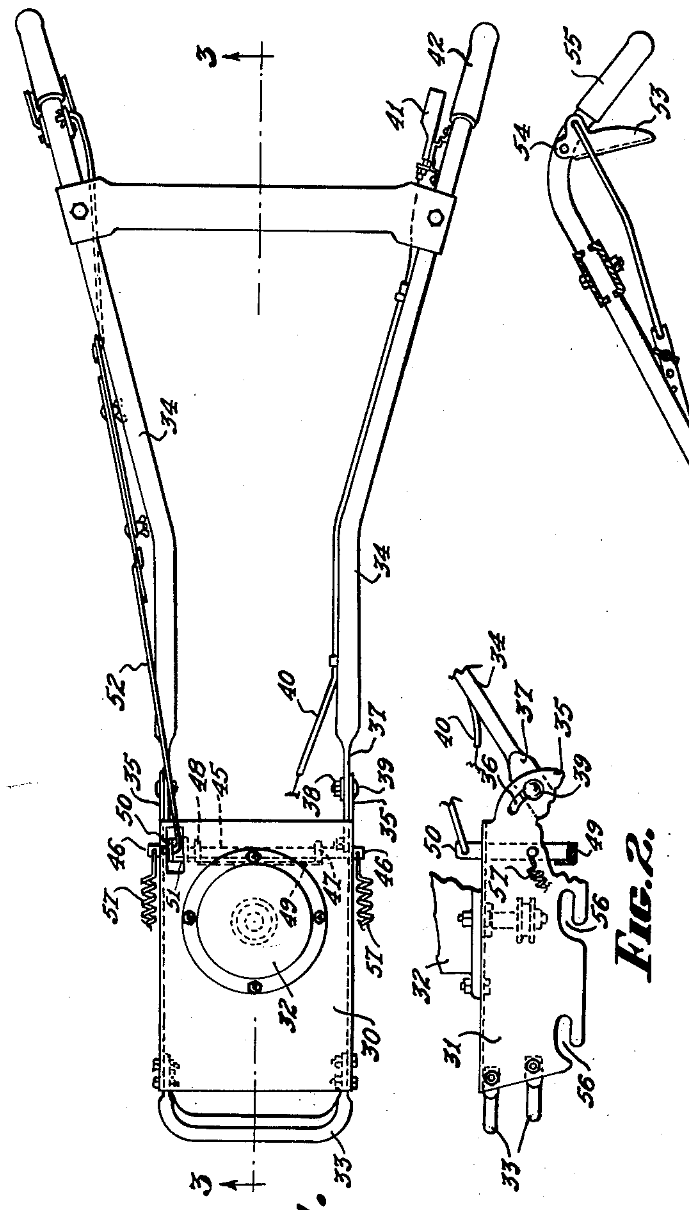
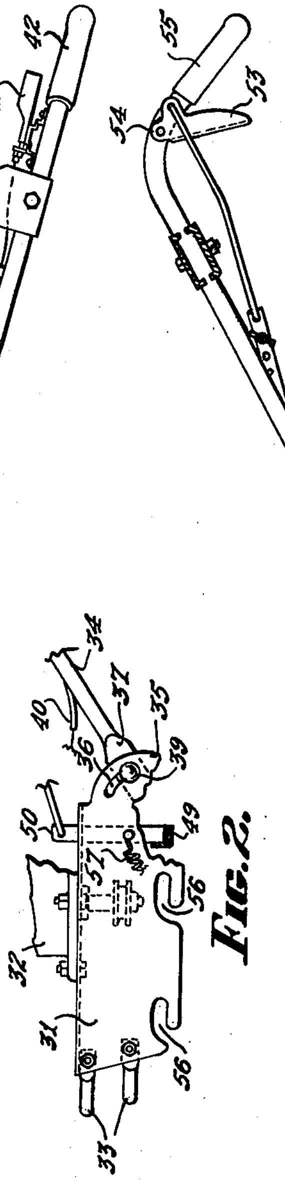
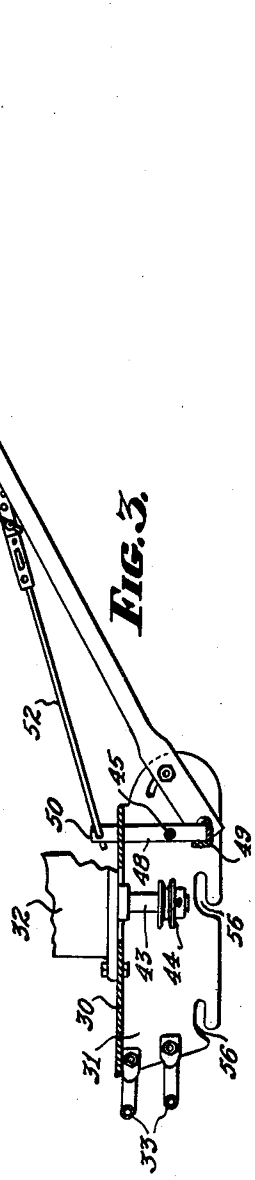
INVENTORS.
PAUL EDRICH, ALBERT H. FOLTZER, DONALD P. HENRY,
ROBERT C. KOSLO, ALVIN E. MEYER, ERVIN J. OSTERHUS,
ARCHER W. RICHARDS, JOHN R. SNOWBALL & WILLIAM D. TITTLE,
BY Allen & Allen
ATTORNEYS.

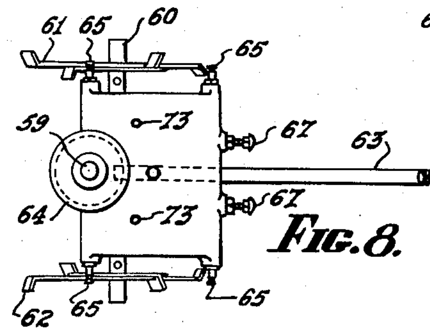
FIG. 8.
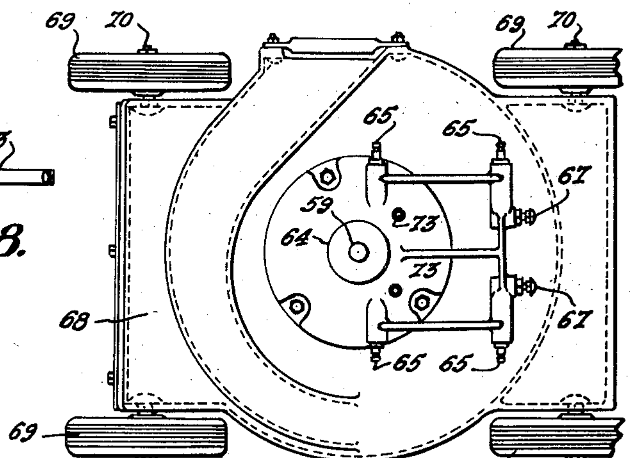
FIG. 4.
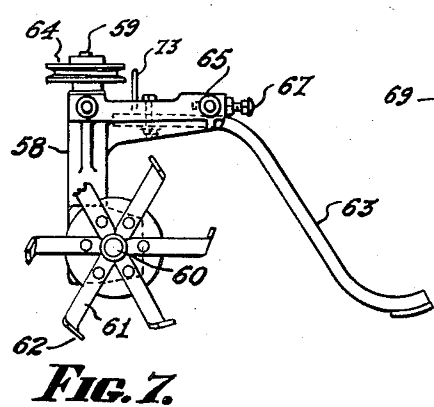
FIG. 7.
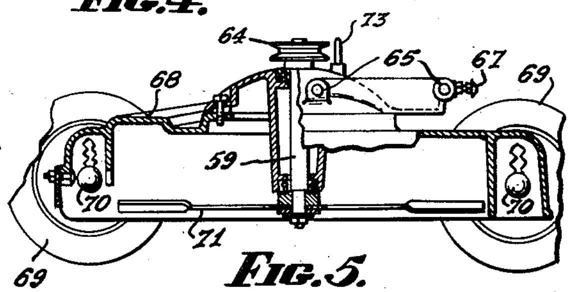
FIG. 5.
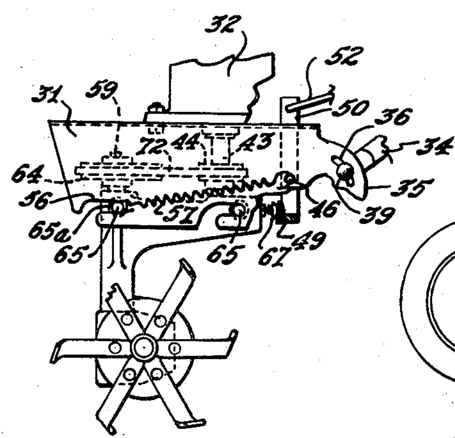
FIG. 9.
32 52 50 34 31 59 36 72 44 43 64 35 46 39 56 49 65 67 65a 65 57 69 69
FIG. 6.
68 67 65a 66 65 57
FIG. 10.
INVENTORS.
PAUL EDRICH, ALBERT H. FOLTZER, DONALD P. HENRY, ROBERT C. KOSLO, ALVIN F. MEYER, ERVIN J. OSTERHUS, ARCHER W. RICHARDS, JOHN R. SNOWBALL & WILLIAM D. TITTLE,
BY Allen + Allen
ATTORNEYS.

GARDEN TOOL COMBINATIONS
Filed Dec. 2, 1955 4 Sheets-Sheet 3
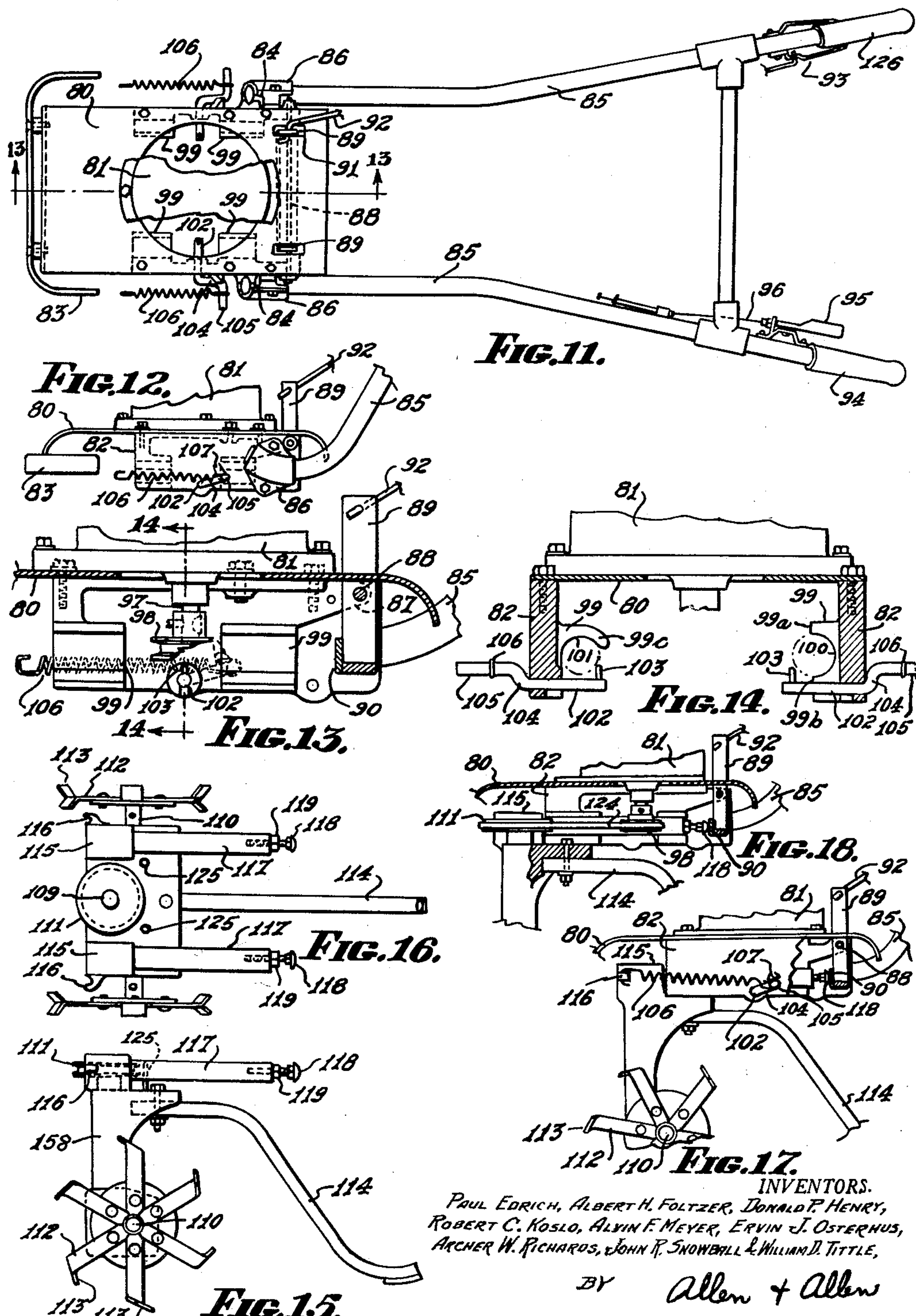
INVENTORS.
PAUL EDRICH, ALBERT H. FOLTZER, DONALD P. HENRY, ROBERT C. KOSLO, ALVIN F. MEYER, ERVIN J. OSTERHUS, ARCHER W. RICHARDS, JOHN R. SNOWBALL & WILLIAM D. TITTLE,
BY Allen + Allen
ATTORNEYS.

GARDEN TOOL COMBINATIONS
Filed Dec. 2, 1955 4 Sheets-Sheet 4
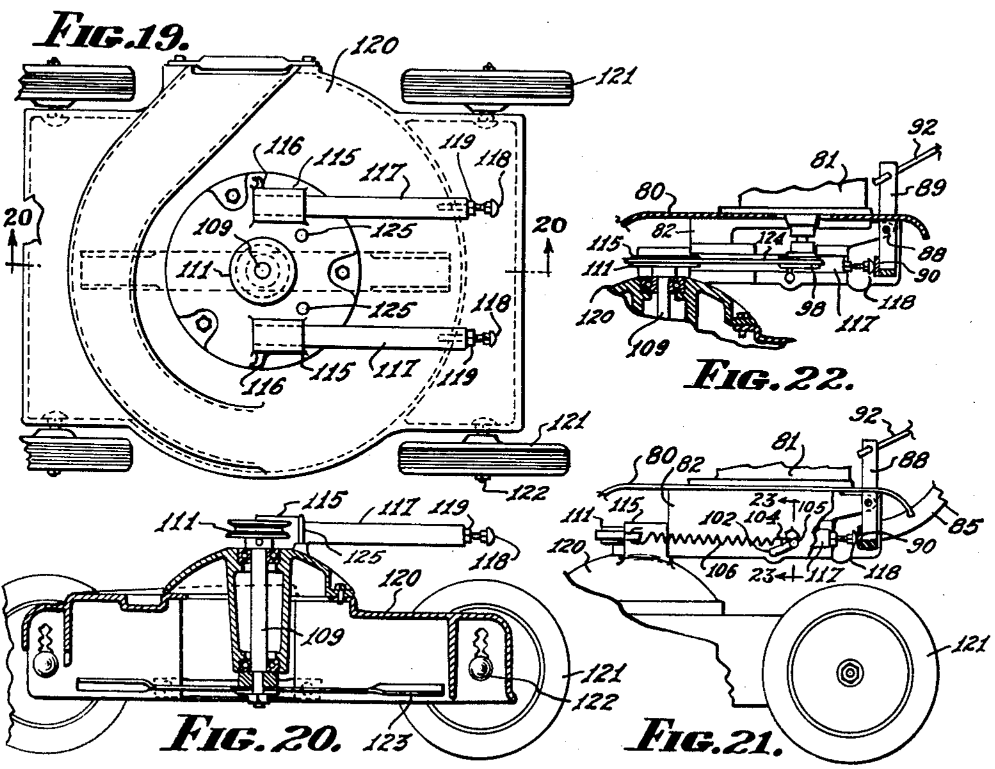
FIG. 19.
FIG. 20.
FIG. 21.
FIG. 22.
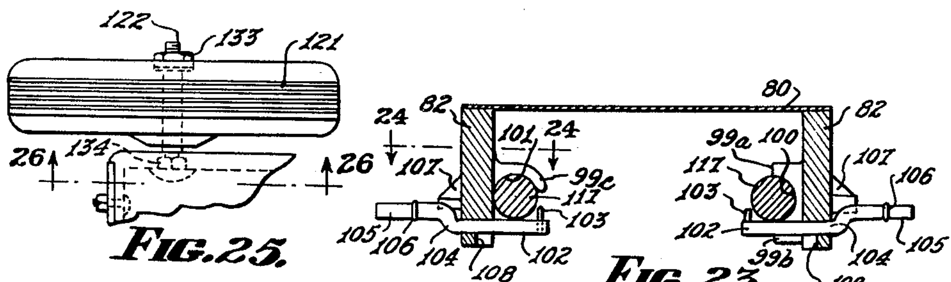
FIG. 25.
FIG. 23.
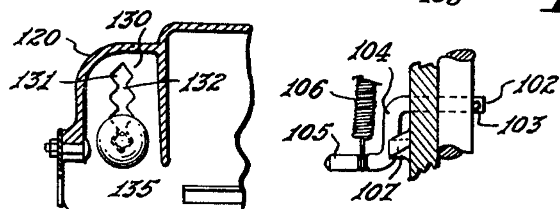
FIG. 24.
FIG. 26.
INVENTORS.
PAUL EDRICH, ALBERT H. FOLTZER, DONALD P. HENRY,
ROBERT C. KOSLO, ALVIN F. MEYER, ERVIN J. OSTERHUS,
ARCHER W. RICHARDS, JOHN R. SNOWBALL & WILLIAM D. TITTLE,
BY Allen & Allen
ATTORNEYS

United States Patent Office 2,864,293

Patented Dec. 16, 1958

1

2,864,293

GARDEN TOOL COMBINATIONS

Paul Edrich, Albert H. Foltzer, and Donald P. Henry, Cincinnati, Robert C. Koslo, Parma, Alvin F. Meyer, Cincinnati, Ervin J. Osterhus, Cleveland, Archer W. Richards, Chagrin Falls, and John R. Snowball and William D. Tittle, Cincinnati, Ohio, assignors to Weber Engineered Products, Inc., Cincinnati, Ohio, a corporation of Ohio

Application December 2, 1955, Serial No. 550,658

19 Claims. (Cl. 172—42)

This invention resides in the provision of a unitary power head which may be used with any one of a plurality of work units, the relationship between the power head and the unit employed with it being such that one may be shifted with respect to the other in order to effect an operative drive between the two.

As will be readily apparent this invention has to do with the field of powered garden tools. There have been placed on the market in the past many different kinds of garden tools, each of which has as an integral part thereof its own power plant.

It is also well known in the art to effect clutching of the driven element with the drive element by tightening and slackening a belt by means of shifting one element with respect to another.

In more recent years it has been demonstrated that a single power unit might be used to operate any one of a plurality of work units.

The instant invention lies in combining the last two mentioned developments whereby a single power head may be employed with any one of a number of work units, the two units being so united in their operative condition that the drive from one to the other may be effected by shifting one with respect to the other.

Typical of those earlier patents wherein the engine unit was an integral part of the garden tool but wherein the drive for the tool was effected by a tightening of a normally slack belt, even to the extent of shifting the engine, are the patents to Squires et al. 2,082,600 entitled "Power Mower" and Shaw 2,260,344 entitled "Tractor." The patents to Donald 2,368,290 entitled "Tractor for Garden Cultivators and Other Implements," Donald 2,489,274 entitled "Tractor Hitch" and Yacoby 2,614,473 entitled "Garden Tractor with Interchangeable Power Tools," are typical of those patents in which a number of different tools may be employed with a single power unit as desired. Finally, the patent to Hupp 2,695,071 illustrates a complete power unit that may be employed with one of several work units.

In none of the above patents, nor in any other arrangements which have heretofore come to light, is there shown a power unit which may be engaged with any one of a number of work units, and after so engaged the units be shifted one with respect to the other in order to effect an operative drive between the two. It is to the invention as thus stated that this application is directed.

There are undoubtedly many ways in which the inventive concept underlying this invention may be applied. Two quite satisfactory and commercially successful embodiments of this invention will be described herein in some detail. One such embodiment is depicted in Figures 1 through 10 while the other embodiment is similarly illustrated in Figures 11 through 26.

It will be readily apparent that a very important object of this invention is to provide a workable combination of a power unit and a selected work unit all as above generally indicated.

2

Another important object of this invention is to embody the invention in structures and arrangements which are economical to manufacture, simple to use and of rugged strength.

These and other objects of this invention will become apparent to those skilled in the art during the course of the following description as considered in the light of the introductory remarks above set forth and with reference to the accompanying drawings. In these drawings like numerals are employed to designate like parts although for the sake of clarity a different set of reference numerals has been employed for each of the embodiments as illustrated in Figures 1 through 10 and Figures 11 through 26. In the drawings which follow:

Figure 1 is a plan view of one form of a power head constituting a part of this invention, Figure 2 is a side elevation, with parts broken away of the power head of Figure 1, Figure 3 is a section taken on the line 3—3 of Figure 1, Figure 4 is a plan view of one form of a work unit designed for use with the power head of Figure 1, Figure 5 is a partial longitudinal section of the work unit of Figure 4, Figure 6 is a side elevation, with parts broken away, showing the assembled combination of the power unit of Figure 1 and the work unit of Figure 4, Figure 7 is a side elevation of another work unit designed for use with the power head of Figure 1, Figure 8 is a top plan view of the work unit of Figure 7, Figure 9 is a side elevation, with parts broken away, showing the assembled combination of the power head of Figure 1 and the work unit of Figure 7, Figure 10 is a fragmentary detail of the housing engagement pins and adjustable clutch abutment members, Figure 11 is a plan view of another power unit constructed according to the teachings of this invention, Figure 12 is a side elevation, with parts broken away, of the power unit of Figure 11, Figure 13 is a section taken on the line 13—13 of Figure 11, Figure 14 is a section taken on the line 14—14 of Figure 13, Figure 15 is a side elevation of a work unit designed for use with the power head of Figure 11, Figure 16 is a top plan view of the work unit of Figure 15, Figure 17 is a side elevation, with parts broken away, showing the assembled combination of the power unit of Figure 11 with the work unit of Figure 15, Figure 18 is a vertical section through the assembled combination of Figure 17, Figure 19 is a plan view of another work unit which may be used with the power head of Figure 11, Figure 20 is a section taken on the line 20—20 of Figure 19, Figure 21 is a side elevation, with parts broken away, showing the assembled combination of the power head of Figure 11 with the work unit of Figure 19, Figure 22 is a vertical section, with parts broken away, through the assembled combination of Figure 21, Figure 23 is an enlarged section taken on the line 23—23 of Figure 21, Figure 24 is a section taken on the line 24—24 of Figure 23, Figure 25 is a fragmentary detail showing an arrangement for mounting the wheel on the work unit of Figure 19, and Figure 26 is a section on the line 26—26 of Figure 25.

*Power head—first embodiment*

Referring now to Figures 1 through 3 there is illustrated a power head constructed according to the teachings of this invention. This head includes a main plate 30 having a pair of depending skirts 31 which may be formed integral therewith or otherwise rigidly secured thereto. A conventional motor may be bolted to the horizontal base plate 30 or fixed thereon by any other suitable means. A pair of bumpers 33 is shown bolted to the forward ends of the skirt members 31. A pair of handle members 34 are pivotally secured to the rear portions of the skirt members 31. One way of accomplishing this is to extend the skirt members 31 beyond the plate 30 to form the enlarged ears 35. Arcuate slots 36 are provided in these ears. These slots receive a bolt which engages a flat extension 37 on the handle 34. It will be obvious that by loosening the nuts 38 on the bolts 39 the members 37 may be shifted with respect to the ears 35 by moving the bolt within the slot 36 so as to bring the handles 34 to desired position.

The throttle control for the motor 32 is generally indicated at 40 and it will be understood that this is of conventional design. The operator may regulate the throttle control 40 by manipulation of the hand lever 41 provided adjacent the hand grip 42. The motor 32 has a conventional drive shaft 43 which is vertically disposed and which extends beneath the plate 30 centrally of the skirt members 31. Fixed to the lower end of this drive shaft 43 is a pulley 44 adapted to receive a belt of ordinary design.

Fixed in the skirts 31 beneath the plate 30 is a shaft 45 which extends as at 46 beyond the sides of these skirts. A pair of members 47 and 48 are freely movable on the shaft 45. The shaft 45 passes through these members 47 and 48 intermediate their ends. A bearing plate which is indicated as comprising a section of channel iron is welded or otherwise fixed to the lower ends of the members 47 and 48. The member 48 extends upwardly from the shaft 45 and may be bent so that its upper portion 50 will extend through a slot 51 provided in the plate 30. Normally the extension 50 of the member 48 will be located centrally of the slot 51.

As will appear more clearly shortly the plate member 49 mounted on the swinging arms 47 and 48 constitutes a part of the mechanism for shifting the power head with respect to a work unit so as to effect an operative drive between the two. To this end there is a clutch control member 52 engaged within the extension 50 of the arm 48. A series of links connects this member 52 with a clutch lever 53 pivoted at 54 to the handle 34 adjacent the hand grip 55. When the clutch lever 53 is pulled toward the hand grip 55 the members 47 and 48 with the plate 49 fixed thereto will be rotated about the shaft 45 in a clockwise direction.

Each of the depending skirts 31 is provided with a pair of slots 56 adapted to receive horizontal pins located on a work unit as will be described. There is an extension spring 57 attached to each protruding end 46 of the shaft 45. These springs 57 will be engaged with the work unit pins so as to urge these pins into engagement with the skirt portions 31 defining the closed end of the slots 56.

*Work unit (tiller)—first embodiment*

Referring now to Figures 7 and 8 there is disclosed a work unit arranged to be assembled with the power head of Figures 1 through 3. The particular work unit here illustrated comprises what is commonly known as a garden tiller. The particular tiller here shown has a casting 58 in which there is a vertical shaft 59. In the lower part of the casting is a horizontal shaft 60. It will be understood that the casting includes suitable worm gears for transferring power from the shaft 59 to the shaft 60 in conventional manner.

On the ends of the shaft 60 are fixed a plurality of earth working tines 61. These tines may be formed with ground-engaging teeth or blades as indicated at 62. Also fixed centrally of the casting 58 and extending rearwardly is a stake 63. This stake may be used as a ground-engaging means to aid in regulating tillage as accomplished by the tines 61 or it may be used as a means for fastening wheels or other earth-working tools to the device. A pulley 64 is fixed to the upper end of the shaft 59 and it will be clear that this pulley is adapted to receive a belt which, as will be explained, also engages the pulley 44 of the power head when the power head and work unit are assembled.

Fixed at either side of the casting 58 are two pairs of pins 65. These pins are designed to be received in the slots 56 of the skirt 31 of the power head shown in Figures 1 through 3. As perhaps best seen in Figure 10 each pin 65 has a turned-down portion 66 near its outer end. This turned-down neck portion 66 has a width just sufficient to receive an end of one of the springs 57 earlier mentioned. The skirts 31 will abut the shoulders **65*a*** so that there will be no lateral play between the power head and work unit.

Fixed in the rear of the casting 58 are two adjustable pins or abutments 67. Again as perhaps best seen in Figure 10, these members 67 may comprise threaded bolts which may be maintained in desired position by the nuts 68. It is against these abutments 67 that the clutch plate 49 moves when it is desired to shift the power head and work unit with respect to one another in order to effect a drive between the two as will be described shortly.

*Work unit (mower)—first embodiment*

In Figures 4 and 5 there is illustrated another form of work unit particularly adapted for use with the power head of Figures 1 through 3. This unit includes a skirted frame portion 68 which may be mounted on four wheels 69 each having a separate stub axle 70. Suitably mounted by conventional means centrally of the frame 68 is a vertical shaft 59 which, of course, corresponds to the vertical shaft of the work unit of Figures 7 and 8. A grass-cutting blade 71 is fixed to the lower end of this shaft and a pulley 64 is fixed to the upper end thereof.

The frame structure 68 is also arranged to provide the four pins 65 and the two abutments 67. These are identical in construction with those discussed in connection with Figures 7 and 8 and shown in detail in Figure 10.

From the foregoing descriptions of the work units of Figures 7, 8 and Figures 4, 5 it will be observed that the mechanism to perform the basic work function may be of conventional design and construction. The essential requirements of such work units insofar as the instant invention is concerned are means for receiving power from the power head and the plurality of pins 65 and abutments 67 arranged as described. Whether the principal operating part of the work unit be a mower blade or earth working tine makes no difference to the inventive concept underlying this invention. It will be obvious that other earth working tools may also be employed so long as they have means to receive power from the power head and so long as they have the pins 65 and abutments 67 arranged as shown.

*Power head and work united assemblies—first embodiment*

Figures 6 and 9 illustrate the assembly including the power head and a work unit. Figure 6 illustrates the combination of the power head of Figures 1 through 3 and the work unit of Figures 4 and 5 while Figure 9 illustrates the combination of the same power head with the work unit of Figures 7 and 8.

In assembling the power head with the work unit, and it makes no difference whether one considers Figure 6 wherein the work unit is that of Figures 4 and 5, or Figure 9 wherein the work unit is that of Figures 7 and 8, the skirt is placed on the pins 65 by introducing these pins at the open ends of the slots 56. As stated the relationship between the skirts 31 and pins 65 is such that these skirts will abut the shoulders 65a. The slots, of course, are wide enough to receive the pin proper 65 but not the portion of wider diameter which defines the shoulder 65a.

After locating the pins 65 within the slots 56 the power head is shoved forward with respect to the work unit so that these pins move to the rear or closed end of the slot 56. The springs 57 which are fixed to the shaft 45 at the ends 46 thereof have hook members at their other ends which are designed to engage the grooves 66 in the pins 65. With the skirt in place as just discussed the springs 57 will be extended so that these just-mentioned hook portions will be engaged within such grooves 66. It will be obvious that the springs 57 tend to maintain the power head and work unit in the position shown in either Figure 6 or Figure 9. In this position the belt 72 will be relatively slack so that there is no power transmitted from the shaft 43 to the shaft 59. The work unit is provided with upstanding pins 73 which serve as belt guides. It will be understood that the belt 72 will pass between these pins 73 when engaged about the pulley 64. When the belt is in slack condition these pins will prevent it from flaring in such manner as to disengage itself from the pulley 64 as is known in the art.

When the power head and work unit are in the assembled condition of either Figure 6 or Figure 9 with the springs 57 tending to maintain them in such position, the clutch plate 49 will either abut or lie closely adjacent the ends of the members 67. The hand lever 53 will be in substantially the position shown in Figure 3. The belt 72 will be slack as described. When the lever 53 is moved toward the handle grip 55 the connecting linkage to the member 50, including the member 52, will rock the plate 49 in a clockwise direction about the shaft 45. This plate 49 will engage the abutment members 67. Forcing this plate about the shaft 45 in a clockwise direction will result in the power head shifting with respect to the work unit as the springs 57 are extended and as the pins 65 ride forward in the slots 56. Such shifting of the power head with respect to the work unit results in the belt 72 being tightened about the pulleys 44 and 64 so that a drive is established from the shaft 43 of the motor 32 to the work shaft 59, assuming the motor to be operating. It will be understood that a relatively small amount of shift is all that is needed to tighten this belt sufficiently to establish the drive.

*Power head—second embodiment*

In Figures 11 through 14 there is disclosed another form of a power head constructed according to the basic teachings of this invention. This power head includes a top plate 80 on which there may be mounted a conventional motor 81. A pair of castings 82 may be bolted or otherwise secured along each side of the plate 80 so as to depend therefrom. A bumper 83 may be secured to the forward portion of the plate 80 if desired. Partial sockets 84 may be formed on the outside, rear portion of the castings 82 to receive the tubular handles 85. Mating socket members 86 may be bolted to the castings 82 so as to clamp the handle members 85 within the socket portions 84.

Each of the castings 82 may have a rearwardly extending ear 87 in which there is fixed a rod 88. A pair of members 89 are pivotally mounted intermediate their ends on this rod 88. The lower ends of these members 89 are fixed to an abutment plate 90. The plate 80 is provided with enlarged slots 91 through which the upper ends of the members 89 may extend. A clutch cable or the like 92 is fixed to the upper end of one of the members 89. This control member 92 extends by suitable linkage along one of the handle members 85 and terminates at a clutch control lever 93 to which it is fixed. Adjacent the hand grip member 94 there is provided a suitable lever 95 for actuating the throttle control linkage generally indicated at 96. The motor 81 has a downwardly extending, vertical drive shaft 97 to which there is fixed a pulley 98.

Referring now particularly to Figures 13 and 14 it will be seen that each of the castings 82 has a pair of inwardly facing socket members 99. The socket members 99 on the right-hand casting, as viewed in Figure 14, define semi-cylindrical recesses 100, the members 99 projecting from the casting 82 as at 99a and 99b to define the upper and lower limits of the semi-cylindrical recess.

The socket members 99 for the left-hand casting 82, as viewed in Figure 14, are constructed somewhat differently. These members 99 have projecting portions 99c which define the upper part of a cylindrical recess 101. There is no lower member corresponding to that indicated at 99c.

Slidably mounted in each casting 82 and underlying the semi-cylindrical recesses 100 and 101 provided in the sockets 99, is a rod 102. Fixed adjacent the inner end of each rod 102 is a pin 103. Each of the rods 102 has a portion 104 extending at substantially right angles thereto and another portion 105 which is substantially parallel thereto. Each rod portion 105 has a spring 106 fixed thereto. As perhaps best seen in Figure 23 each of the castings 82 has a lug on its outer face against which the rod portion may abut when the pins 103 are in the position shown in this figure. Each of the castings 82 is also provided with a recess 108 to receive the pin 103 when it is turned downwardly and the rod 102 moved toward its respective casting.

From the foregoing it will be observed that the power head of Figures 11 through 14, 23 and 24 is a unit comprising a base for the motor, handles by which it may be manipulated, socket forming castings by which it may be mounted on a suitable work unit and an abutment plate which may be moved against abutments located on a work unit so as to shift the power head with respect to the work unit against the action of springs 106, the sockets formed in the castings permitting such movement.

*Work unit (tiller)—second embodiment*

In Figures 15 and 16 there is disclosed a work unit adapted for use in connection with the power head of Figures 11 through 14. The particular work unit here shown is what may be described as a garden tiller. This tiller has a casting 158 in which there is mounted a vertical shaft 109 and a horizontal shaft 110. It will be understood that conventional gearing, not shown, between these two shafts will result in rotation of the shaft 110 upon rotation of the vertical shaft 109. A pulley 111 is fixed to the upper end of the vertical shaft 109. Earth-working tines 112 are fixed to the outer ends of the horizontal shaft 110. Each of these tines 112 may have a specially formed ground engaging cutting edge 113. Also fixed to the casting 158 is a stake 114 which may be used to regulate the depth of tillage obtained by the tines 112 or it may be used as a means for fastening wheels or other ground-engaging tools.

The casting 158 is provided with a pair of upstanding lugs 115, one at either side of the pulley 111. Hooks 116 extend outwardly from the sides of these lugs 115. There is a guide bar 117 fixed within each lug 115. An abutment 118, which may comprise a threaded bolt, is provided for the outer end of each bar 117. These abutments 118 may be held in desired adjusted position by nuts 119. As will be described more fully shortly it will be apparent that the bars 117 are designed to be received in the semi-cylindrical recesses 100 and 101 of the socket members 99 of the power head described in Figures 11 through 14. The abutment members 118 are those against which the abutment plate 90 will engage when it is desired to shift these units apart against the action of springs 106. These springs will engage the hook members 116.

*Work unit (mower)—second embodiment*

In Figures 19 and 20 there is disclosed another form of work unit which may be employed with the power head of Figures 11 through 14. This unit comprises a base frame 120 supported on four wheels 121 each of which has its own stub axle 122. The base frame 120 is arranged to support a vertical shaft 109 centrally thereof, there being a pulley 111 fixed to the upper end of this shaft. To the lower end of this shaft is fixed a suitable blade 123 for cutting grass.

The base frame 120 is provided with a pair of lugs 115, one at either side of the pulley 111. Struck outwardly from these lugs are hook members 116. Again it will be observed that there is a bar 117 fixed within each of the lugs 115. An adjustable abutment member 118 is provided for the outer end of each of these bars 117 and proper adjustment may be maintained by the nuts 119.

As in the case with the work unit of Figures 15 and 16, and as will be described in greater detail shortly, the bars 117 and abutments 118 of the work unit of Figures 19 and 20 are designed to be received in the semi-cylindrical recesses 100 and 101 of the socket members constituting a part of the power head of Figures 11 through 14. The abutment plate 90 may engage the abutment 118 so that upon clockwise movement of this plate the power head and work unit will be shifted against the action of the springs 106 which are engaged with the hook members 116.

*Power head and work unit assemblies—second embodiment*

In Figures 17 and 18 the power head of Figures 11 through 14 is shown assembled with the work unit of Figures 15 and 16 while in Figures 21 and 22 this same power head is shown assembled with the work unit of Figures 19 and 20. Figure 23 will also aid one to understand the manner of assembling these various units.

In order to place the power head on the work unit the pins 102, see Figure 23, are rotated through 180 degrees from the position there illustrated and then withdrawn to the extent that the pins 103 will seat within the recesses 108. Upon this taking place the inner end of the rod 102 will be substantially flush with the inner face of the casting 82. The power head may then be placed on the bars 117 by first engaging one of these bars within the semi-cylindrical recess 100 defined by the socket members **99*a* and 99*b*. The socket member 99*c* may then be permitted to rest on the other bar 117 so that the latter bar is engaged within the recess 101. Following this the rods 102 are pushed and turned to the position illustrated in Figure 23. In this position it will be observed that the rod 102 as seen at the left side of this figure will constitute the sole means for maintaining that bar 117 within the recess 101 while the rod 102 at the right side of this figure will cooperate with the socket member 99*b* to accomplish the same result. The upstanding pins 103 will prevent the rods 102 from accidentally being withdrawn from beneath the bars 117**.

With the power head placed in the manner just described the springs 106 are extended to engage the hook members 116 which are fixed on the work unit. Since the other end of the spring 106 is fixed to the rod 105, which rod is a part of the power head, the spring will urge the castings 82 into engagement with the lugs 115. Also, the rod 102 is so located that when the springs 106 are thus hooked in position the rod end 105 to which the spring is fastened will lie in a horizontal plane above that in which the rod 102 lies so that the rod portion 104 will be maintained against the projecting abutment 107. This serves to keep the pins 103 in their vertical position as illustrated in Figure 23 so that the rods 102 will not be displaced. It will be obvious that the description just given is applicable equally to the assembly of Figures 21 and 22 as well as that of Figures 17 and 18. With the power head in place on the work unit as described, the casting 82 abutting the lug 115, the belt 124 will be in its slackened condition. To this end belt retaining pins 125 are provided on the work unit to insure that the belt will not fall off of the pulley 111. When the clutch lever 93 is moved toward the hand grip member 126 the control cable moves the arms 89 in a clockwise direction about the shaft 88. This movement of these arms results in the plate 90 engaging the abutment member 118 whereupon further clockwise movement of this plate will cause the power head and work unit to be shifted one with respect to the other as permitted by the sliding engagement of the casting sockets with the bars 117. It will be understood that upon release of the clutch lever 93 the springs 106 will return the units so that the castings 82 abut the lugs 115. In this latter position of the parts the plate 90 will lie immediately adjacent the abutment 118 or it may even engage it lightly. It will also be obvious that when the power head and work unit are spread apart by clockwise movement of the plate 90 the belt 124 will be tightened so as to effect a driving engagement between the motor drive shaft 97 and the work shaft 109.

*Mower wheel mount*

In Figures 25 and 26 there is illustrated a novel way for adjustably mounting the wheels 121 in the work unit main frame 120. This frame 120 includes a skirt 130. For each wheel 121 the skirt is provided with a series of more or less rectangular orifices 131 separated one from the other by the passages 132. The stub axle 122 for each wheel may comprise a bolt threaded at one end to receive a nut 133 and having a square portion 134 immediately adjacent its head 135. The rectangular orifices 131 will just nicely receive the square portion 134, which portion is greater than the diameter of the rod 122. The passages 132 are slightly larger than the diameter of the rod 122.

From the foregoing it will be observed that when it is desired to change the elevation of the mower blade one simply loosens the nut 133 and pushes the axle 122 inwardly until the square portion 134 is disengaged from an orifice 131. Following this the axle 122 may then be moved upwardly or downwardly, as desired, the passages 132 being just sufficient to permit this. After the axle 122 has been brought to the desired level as determined by an orifice 131 the axle 122 is then shoved outwardly until the square portion 134 thereof engages within the selected orifice after which the nut 133 may be tightened to hold this in place. By this arrangement the wheels may be adjusted without completely removing the axle.

*General operation*

It is believed that in the foregoing description the operation of the various assemblies constructed according to the teachings of this invention have been rather fully set forth. At this time only a brief review will be set forth.

Each of the power heads constructed according to the teachings of this invention, one shown in Figures 1 through 3 and the other in Figures 11 through 14, comprises means for mounting a motor and controlling it in conventional manner. Each such head includes means by which it may be slidably maintained on a work unit. Each head is provided with springs which, when engaged to the work unit, will maintain the power head and work unit so that a belt extending between the drive shaft of the motor and the work shaft will be in relaxed position and an abutment plate pivotally supported from the power head will lie either against or immediately adjacent adjustable abutment means provided on the work unit.

Each power head is provided with means by which the abutment plate may be moved against the work unit abutment means so as to cause the power head and work unit to be shifted with respect to one another against the action of the aforementioned springs, such shifting of these units causing the belt to tighten about the pulleys fixed to the respective shafts whereby to effect a driving engagement between the motor carried by the power head and the earth working tools carried by the work unit.

It will be obvious to those skilled in the art that various modifications may be made in the embodiments herein shown without departing from the scope and spirit of this invention. It is also to be understood that while this invention has been shown as embodied in certain particular arrangements and structures, these arrangements and structures are examplary only and it is not intended that this invention be limited to such except insofar as these are specifically set forth in the subjoined claims.

The invention having thus been described, what is claimed as new and what is desired to be protected by United States Letters Patent is:

1. A garden tool comprising the combination of a power head and a work unit; said power head including a motor, controls for said motor, drive means operated by said motor, support receiving means, and first abutment means; said work unit including a work performing member, driven means connected to said member, a support, and second abutment means; power transmission means between said drive means and said driven means, said transmission means having an inoperative position and an operative position; said support being slidable within said support receiving means; resilient means urging said transmission means to its said inoperative position and maintaining said support within said support receiving means; and means for urging said first abutment means and said second abutment means against one another to move said power unit and said work unit with respect to one another against the urging of said resilient means, whereby said transmission means is moved to its operative position.

2. In a powered garden tool structure: a power head having a base, a motor mounted on said base, a pair of parallel skirts depending from said base, a drive shaft rotated by said motor, a pulley fixed to said drive shaft, said drive shaft being vertically disposed and said pulley lying between said skirts, control handles fixed to said base, an abutment plate mounted for swinging movement beneath said base between said skirts, means to move said plate, pin-receiving slots in said skirt, and springs fixed to said base; a work unit having a base, a work shaft in said base, a pulley fixed to said work shaft, said work shaft being vertically disposed and said pulley being fixed to the upper end of said work shaft, a tool connected to said work shaft so as to be operated thereby, pins fixed to said base so as to be receivable in said slots, an abutment member secured to said base, and hooks on said base to which said springs may be connected; and a normally slack belt engaging said pulleys; whereby said power head may be connected to said work unit by engagement of said pins in said slots and securing of said springs to said hooks, said pins being slidable in said slots, movement of said abutment plate against said abutment member serving to slide said power head on said pins so as to tighten said belt.

3. The structure of claim 2 in which there are four of said slots and four of said pins, said pins lying in a common plane.

4. The structure of claim 3 in which there are two of said slots in each said skirt, and each said pin having a shoulder to engage a said skirt.

5. The structure of claim 2 in which there is a rod fixed to said skirts, an arm pivoted on said rod, said abutment plate being fixed to said arm, and said means for moving said plate including linkage connected to said arm and extending along said control handles.

6. The structure of claim 5 in which said arm extends through an opening in said base, said linkage being connected to said arm above said base.

7. The structure of claim 5 in which there are two of said springs, each said spring being fixed to said rod.

8. The structure of claim 2 in which there are a pair of said abutment members, each said abutment member being adjustable independently of the other.

9. The structure of claim 2 in which there are two of said pins on each side of said work unit base, said pins lying in a common horizontal plane, each said pin being at the corner of an imaginary rectangle defined by lines connecting said pin's seriatim, and two of said abutment members, said abutment members lying in substantially the same horizontal plane as said pins and on either side of a vertical plane passing through said work shaft parallel to said skirts.

10. The structure of claim 9 in which each said skirt has a pair of said slots, each said slot having an open end and a closed end, said springs normally maintaining said pins at said closed ends, actuation of said plate moving means to move said abutment plate against said abutment members serving to slide said pins towards the open ends of said slots.

11. In a powered garden tool structure: a power head comprising a base, a motor mounted on said base, a vertically disposed drive shaft rotated by said motor, a pulley fixed to the lower end of said drive shaft, control handles fixed to said base, an abutment plate movable on said base, means to move said abutment plate, springs secured to said base, and socket members fixed to said base; a work unit comprising a base, a vertically disposed work shaft mounted for rotation in said base, a pulley fixed to the upper end of said work shaft, a work tool connected to said work shaft so as to be operated thereby, bars fixed to said work unit base so as to be receivable in said sockets, an abutment member fixed to said work unit base, and hooks on said work unit base to which said springs may be engaged; and a normally slack belt engaging said pulleys; whereby said power head may be connected to said work unit by engagement of said bars in said sockets and securing of said springs to said hooks, said bars being slidable in said sockets, movement of said abutment plate against said abutment member serving to slide said power head on said bars so as to move said pulleys apart and tighten said belt.

12. The structure of claim 11 in which there are a pair of said socket members, one said socket member having an upper lip and a lower lip, the other of said socket members having an upper lip only, and means to hold the upper lip of said other socket member in engagement with a said bar.

13. The structure of claim 12 in which said last mentioned means comprises a shiftable rod, said rod having a pin in one end at right angles thereto, said rod being shiftable to extend beneath the upper lip of said other socket member and rotatable to bring said pin to a vertical position.

14. The structure of claim 13 in which a said spring is fixed to said rod and including an abutment against which said rod is urged by said spring when said pin is in its vertical position.

15. The structure of claim 11 in which each said socket member comprises a casting fixed beneath said power head base, said castings being parallel to one another.

16. The structure of claim 11 in which there are a pair of said bars, said bars being parallel to one another and lying in a common horizontal plane.

17. The structure of claim 16 in which there is a said abutment member fixed in each said bar.

18. The structure of claim 11 in which there are lugs on said work unit base, said bars being fixed in said lugs, and said springs urging said socket members against said lugs whereby said belt is in its normally slack condition.

19. The structure of claim 11 in which said socket members define a pair of parallel semi-cylindrical bearings, a pair of said bars, a said abutment member on an end of each said bar, a rod fixed in said power head base, an arm pivoted on said rod, said abutment plate being fixed to the lower end of said arm, and said means to move said abutment plate including linkage connected to the upper end of said arm.

References Cited in the file of this patent

UNITED STATES PATENTS

| | | |
|---|---|---|
| 2,082,600 | Squires et al. | June 1, 1937 |
| 2,497,639 | Underwood | Feb. 14, 1950 |
| 2,535,701 | Shaw | Dec. 26, 1950 |
| 2,614,473 | Yacoby | Oct. 21, 1952 |
| 2,614,474 | Merry | Oct. 21, 1952 |
| 2,641,889 | Bright | June 16, 1953 |
| 2,695,071 | Hupp | Nov. 23, 1954 |
| 2,750,859 | Smithburn | June 19, 1956 |